US008665696B2

(12) United States Patent
van Nee

(10) Patent No.: US 8,665,696 B2
(45) Date of Patent: Mar. 4, 2014

(54) FREQUENCY DIVISION MULTIPLEXING SYSTEM WITH SELECTABLE RATE

(75) Inventor: D. J. Richard van Nee, De Meern (NL)

(73) Assignee: MOSAID Technologies Incorporated, Ottawa, Ontario (CA)

( * ) Notice: Subject to any disclaimer, the term of this patent is extended or adjusted under 35 U.S.C. 154(b) by 10 days.

(21) Appl. No.: 13/355,851

(22) Filed: Jan. 23, 2012

(65) Prior Publication Data

US 2012/0163511 A1 Jun. 28, 2012

Related U.S. Application Data

(60) Division of application No. 11/156,140, filed on Jun. 17, 2005, now Pat. No. 8,111,607, which is a continuation of application No. 10/410,375, filed on Apr. 9, 2003, now Pat. No. 6,992,972, which is a continuation of application No. 09/224,695, filed on Jan. 4, 1999, now Pat. No. 6,563,786.

(30) Foreign Application Priority Data

Jan. 6, 1998 (EP) ..................................... 98200010

(51) Int. Cl.
*H04J 11/00* (2006.01)
(52) U.S. Cl.
USPC ......................................... 370/208; 370/210
(58) Field of Classification Search
None
See application file for complete search history.

(56) References Cited

U.S. PATENT DOCUMENTS

| 3,488,455 | A | 1/1970 | Chang |
| 3,534,264 | A | 10/1970 | Blasbalg et al. |
| 4,972,439 | A | 11/1990 | Kuznicki et al. |
| 5,282,222 | A | 1/1994 | Fattouche et al. |
| 5,291,289 | A | 3/1994 | Hulyalkar et al. |
| 5,371,548 | A | 12/1994 | Williams |

(Continued)

FOREIGN PATENT DOCUMENTS

| CA | 2690127 | 7/1997 |
| EP | 0589709 | 3/1994 |

(Continued)

OTHER PUBLICATIONS

Viterbi, "Error Bounds for Convolutional Codes and an Asymptotically Optimum Decoding Algorithm", IEEE Transactions on Information Theory, vol. IT-13 (2), pp. 260-269, Apr. 1967.

(Continued)

*Primary Examiner* — Phirin Sam
(74) *Attorney, Agent, or Firm* — Winstead PC

(57) ABSTRACT

An OFDM system uses a normal mode which has a symbol length T, a guard time TG and a set of N sub-carriers, which are orthogonal over the time T, and one or more fallback modes which have symbol lengths KT and guard times KTG where K is an integer greater than unity. The same set of N sub-carriers is used for the fallback modes as for the normal mode. Since the same set of sub-carriers is used, the overall bandwidth is substantially constant, so alias filtering does not need to be adaptive. The Fourier transform operations are the same as for the normal mode. Thus fallback modes are provided with little hardware cost. In the fallback modes the increased guard time provides better delay spread tolerance and the increased symbol length provides improved signal to noise performance, and thus increased range, at the cost of reduced data rate.

39 Claims, 2 Drawing Sheets

(56) References Cited

U.S. PATENT DOCUMENTS

| | | | |
|---|---|---|---|
| 5,406,551 A | 4/1995 | Saito et al. | |
| 5,425,050 A | 6/1995 | Schreiber et al. | |
| 5,444,697 A | 8/1995 | Leung et al. | |
| 5,450,456 A | 9/1995 | Mueller | |
| 5,600,672 A | 2/1997 | Oshima et al. | |
| 5,602,835 A | 2/1997 | Seki et al. | |
| 5,608,764 A | 3/1997 | Sugita et al. | |
| 5,673,290 A | 9/1997 | Cioffi | |
| 5,682,376 A | 10/1997 | Hayashino et al. | |
| 5,694,389 A | 12/1997 | Seki et al. | |
| 5,699,364 A | 12/1997 | Sato et al. | |
| 5,726,978 A | 3/1998 | Frodigh et al. | |
| 5,732,113 A | 3/1998 | Schmidl et al. | |
| 5,818,813 A | 10/1998 | Saito et al. | |
| 5,822,323 A * | 10/1998 | Kaneko et al. | 370/480 |
| 5,862,189 A | 1/1999 | Huisken et al. | |
| 5,892,879 A | 4/1999 | Oshima | |
| 5,909,436 A | 6/1999 | Engstrom et al. | |
| 5,953,311 A | 9/1999 | Davies et al. | |
| 5,959,980 A | 9/1999 | Scott | |
| 5,963,592 A | 10/1999 | Kim | |
| 5,991,289 A | 11/1999 | Huang | |
| 5,995,483 A * | 11/1999 | Marchok et al. | 370/207 |
| 6,005,840 A | 12/1999 | Awater et al. | |
| 6,018,528 A | 1/2000 | Gitlin et al. | |
| 6,038,275 A | 3/2000 | Taura et al. | |
| 6,038,450 A | 3/2000 | Brink et al. | |
| 6,088,327 A | 7/2000 | Muschallik et al. | |
| 6,091,702 A | 7/2000 | Saiki | |
| 6,115,354 A | 9/2000 | Weck | |
| 6,137,847 A | 10/2000 | Stott et al. | |
| 6,148,024 A | 11/2000 | Ho et al. | |
| 6,172,993 B1 | 1/2001 | Kim et al. | |
| 6,192,056 B1 | 2/2001 | Tsuruoka | |
| 6,219,334 B1 | 4/2001 | Sato et al. | |
| 6,226,337 B1 | 5/2001 | Klank et al. | |
| 6,304,611 B1 | 10/2001 | Miyashita et al. | |
| 6,314,083 B1 | 11/2001 | Kishimoto et al. | |
| 6,330,293 B1 | 12/2001 | Klank et al. | |
| 6,359,938 B1 * | 3/2002 | Keevill et al. | 375/316 |
| 6,452,977 B1 | 9/2002 | Goldston et al. | |
| 6,535,501 B1 | 3/2003 | Bohnke | |
| 6,546,055 B1 | 4/2003 | Schmidl et al. | |
| 6,563,786 B1 | 5/2003 | Nee | |
| 6,628,730 B1 | 9/2003 | Stott et al. | |
| 6,992,972 B2 | 1/2006 | Nee | |
| 7,145,971 B2 | 12/2006 | Raleigh et al. | |

FOREIGN PATENT DOCUMENTS

| | | |
|---|---|---|
| EP | 0762701 | 3/1997 |
| EP | 0589702 | 5/1999 |
| EP | 0929172 | 7/1999 |
| GB | 2291314 | 1/1996 |
| JP | 07-273741 | 10/1995 |
| JP | 7273741 | 10/1995 |
| JP | 1022973 | 1/1998 |
| WO | WO/95/02289 | 1/1995 |
| WO | WO/97/30531 | 8/1997 |

OTHER PUBLICATIONS

Viterbo, et al., "How to Combat Long Echoes in OFDM Transmission Schemes: Sub-Channel Equalization or More Powerful Channel Coding", IEEE 0-7803-2509-5, pp. 2069-2074, 1995.

Webb, et al., "Modern Quadrature Amplitude Modulation, Principles and Applications for Fixed and Wireless Channels", IEEE ISBN 0-7803-1098-5, pp. 1-2, 80-82. 85-91, 101, 104-107, 181-182,191 and193, 1994.

Weinstein, et al., "Data Transmission by Frequency-Division Multiplexing Using the Discrete Fourier Transform", IEEE Transactions on Communication Technology, vol. Com-19 (5), 628-634, Oct. 1971.

Wi-Lan Wireless Data Communications, "White Paper—Wide-band Orthogonal Frequency Multiplexing (W-OFDM)", WiLan Inc., Sep. 2000.

Wood, "The DVB Project:Philosophy and Core System", Electronics Communication Engineering Journal, vol. 9 (1), pp. 5-10, Feb. 1997.

Zou, et al., "COFDM: An Overview", IEEE Transactions on Broadcasting, vol. 41 (1), pp. 1-8, Mar. 1995.

Moose, "A Technique for Orthogonal Frequency Division Multiplexing Frequency Offset Correction", IEEE Transactions on Communications, vol. 42 (1), Oct. 1994, pp. 2908-2914.

Aldis, J.P., et atl., "Physical Layer Architecture and Performance in the WAND User Trial System," ACTS Mobile Telecommunications Summit, pp. 196-203, 1996.

Bingham, J A.C., Multicarrier Modulation for Data Transmission: An Idea Whose Time Has Come,: IEEE Communication Magazine, pp. 5-14, 1990.

European Search Report dated Jul. 3, 1998, for EP Application No. 98 20 0010.

European Telecommunications Standard ETS 300 401, Second Edition, "Radio Broadcasting Systems: Digital Audio Broadcasting (DAB) to Mobile, Portable and Fixed Receivers," pp. 1-206, 1997.

Hadara H. and Prasad R., "Performance Analysis of an OFDM Based Wireless ATM Communication System," Proc. PIMRC 1997, pp. 1095-1099, Sep. 1997.

Kaitz, T., "TGa Preamble Improvement Proposal," IEEE 802.11-98/308, pp. 1-3, Sep. 1998.

Kaitz, T., and Chayat, N., "TGa Preamble Improvement Proposal," IEEE 802.11-98/369, pp. 1-7, Nov. 1998.

Larsson, et al., "Mixed Traffic in a Multicarrier System," IEEE Vehicular Technology Conference, pp. 1259-1263, 1996.

Memorandum and Order issued Jul. 20, 2004 in Civil Action Docket No. 03-3138, United District Court for the Eastern Division of Pennsylvania, pp. 1-104 (Markman decision interpreting claims for parent of instant application).

Moose, P, H., "A Technique for Orthogonal Frequency Division Multiplexing Frequency Offset Correction," IEEE Transactions on Communication, vol. 42, No. 10, pp. 2908-2914, 1994.

Okada, et al., "Wideband Indoor Radio System Using Orthogonal Multicarrier Modulation," IEEE International Conference on Systems Engineering, pp. 457-462, 1992.

Rasmussen, et al., "A Unifying Discrete—Time Model for Direct Sequence and Multicarrier Variable Rate Broadband CDMA," Seventh IEEE International Symposium on Personal, Indoor and Mobile Radio Communications, vol. 3, pp. 1111-1115, 1996.

Takanashi, H., et al., "Merged OFDM Physical Layer Specification for the 5 GHz Band," Doc: IEEE P802.11-98/72r1, pp. 1-27, 1998.

Takanashi, H., et al., "Outline of Draft Standard for 5 GHz," IEEE 802.11-98/272, pp. 1-8, Jul. 1998.

Takanashi, H., et al., "Summary of Merged Proposal," Doc: IEEE P802.11-98/72a, pp. 1-5, 1998.

Uehara, M., et al., "A Study of Terrestrial ISDB Systems: BST-OFDM Schemes and Multiplexing," ITE Technical Report vol. 2, No. 22, pp. 23-28, Mar. 15, 1996.

Van Nee, R., "OFDM for High Speed Wireless Networks," Doc: IEEE P802.11-97/123, pp. 1-15, 1997.

Van Nee, R., "OFDM Performance Comparison Submission Template," Doc: IEEE 802.11-98/73, pp. 1-2, 1998.

Van Nee, R., et al., "OFDM Codes for Peak-to-Average Power Reduction and Error Correction," IEEE 0-7803-3336-5/96, pp. 740-744, 1996.

Van Nee, R., et al., "OFDM Physical Layer Specification for the 5 GHz Band," Doc: IEEE P802.11-98/12, pp. 1-12, 1998.

Van Nee, R., et al., "OFDM Wireless Multimedia Communications," Artech House Publishers, pp. 20-23, 229-230, 2000.

Van Nee, R., et al., "Scaleable OFDM Radio Parameters," Doc: IEEE P802.11-97/92, pp. 1-12, 1997.

Van Nee, R., et al., "Sharing Performance Evaluation for TGa PHY Submission," Doc: IEEE P802.11-98/71r1, pp. 1-5, 1998.

"Defendants' Invalidity Contentions", *MOSAID Technologies Inc. v. Dell Inc., et al.*, Civil Action No. 2:11-CV-179-MS, In the United States District Court for the Eastern District of Texas Marshall Division, served on Jun. 14, 2012.

(56) References Cited

OTHER PUBLICATIONS

Exhibit D.0, Invalidity Contentions for U.S. Patent No. 6,563,786 and 6,992,972 in consistent with or suggested by Mosaid's Preliminary Infringement Contentions L.P.R. 3-3 Invalidity Contentions, *MOSAID Technologies Inc.* v. *Dell Inc. et al.*, Civil Action No. 2:11-CV-179-MS, In the United States District Court for the Eastern District of Texas Marshall Division, served on Jun. 14, 2012, 89 pages.

"Exhibit D.1, Invalidity Contentions for U.S. Patent No. 6,563,786 and 6,992,972 in light of Burst Synchronization for OFDM-Based Cellular Systems with an Optional Separate Signaling Channel ("Stantchev") as Base Reference," Defendants' L.P.R. 3-3 Invalidity Contentions, *MOSAID Technologies Inc.* v. *Dell Inc. et al.*, Civil Action No. 2:11-CV-179-MS, In the United States District Court for the Eastern District of Texas Marshall Division, served on Jun. 14, 2012, 28 pages.

"Exhibit D.2, Invalidity Contentions for U.S. Patent No. 6,563,786 and 6,992,972 in light of OFDM Transmission Method, OFDM Transmission Device, and OFDM Receiving Device ("Takashi") as Base Reference," Defendants' L.P.R. 3-3 Invalidity Contentions, *MOSAID Technologies Inc.* v. *Dell Inc. et al.*, Civil Action No. 2:11-CV-179-MS, In the United States District Court for the Eastern District of Texas Marshall Division, served on Jun. 14, 2012, 37 pages.

"Exhibit D.3, Invalidity Contentions for U.S. Patent No. 6,563,786 and 6,992,972 in light of Orthogonal Frequency Division Multiplexing Transmission System and Transmitter and Receiver Adapted to the Same ("Saito") as Base Reference," Defendants' L.P.R. 3-3 Invalidity Contentions, *MOSAID Technologies Inc.* v. *Dell Inc. et al.*, Civil Action No. 2:11-CV-179-MS, In the United States District Court for the Eastern District of Texas Marshall Division, served on Jun. 14, 2012, 41 pages.

"Exhibit D.4, Invalidity Contentions for U.S. Patent No. 6,563,786 and 6,992,972 in light of Communication System ("Oshima") as Base Reference," Defendants' L.P.R. 3-3 Invalidity Contentions, *MOSAID Technologies Inc.* v. *Dell Inc. et al.*, Civil Action No. 2:11-CV-179-MS, In the United States District Court for the Eastern District of Texas Marshall Division, served on Jun. 14, 2012, 43 pages.

"Exhibit D.5, Invalidity Contentions for U.S. Patent No. 6,563,786 and 6,992,972 in light of Physical Layer Architecture and Performance in the WAND User Trial System ("Aldis") as Base Reference," Defendants' L.P.R. 3-3 Invalidity Contentions, *MOSAID Technologies Inc.* v. *Dell Inc. et al.*, Civil Action No. 2:11-CV-179-MS, In the United States District Court for the Eastern District of Texas Marshall Division, served on Jun. 14, 2012, 20 pages.

"Exhibit D.6, Invalidity Contentions for U.S. Patent No. 6,563,786 and 6,992,972 in light of a Technique for Orthogonal Frequency Division Multiplexing Frequency Offset Correction ("Moose") as Base Reference," Defendants' L.P.R. 3-3 Invalidity Contentions, *MOSAID Technologies Inc.* v. *Dell Inc. et al.*, Civil Action No. 2:11-CV-179-MS, In the United States District Court for the Eastern District of Texas Marshall Division, served on Jun. 14, 2012, 20 pages.

"Exhibit D.7, Invalidity Contentions for U.S. Patent No. 6,563,786 and 6,992,972 in light of Digital Video Broadcasting (DVB); Framing structure, channel coding and modulation for digital Terrestrial television (DVB-T) ("ETSI DVB") as Base Reference," Defendants' L.P.R. 3-3 Invalidity Contentions, *MOSAID Technologies Inc.* v. *Dell Inc. et al.*, Civil Action No. 2:11-CV-179-MS, In the United States District Court for the Eastern District of Texas Marshall Division, served on Jun. 14, 2012, 28 pages.

"Exhibit D.8, Invalidity Contentions for U.S. Patent No. 6,563,786 and 6,992,972 in light of Radio Broadcasting systems; Digital Audio Broadcasting (DAB) to mobile, portable and fixed receivers ("ETSI DAB") as Base Reference," Defendants' L.P.R. 3-3 Invalidity Contentions, *MOSAID Technologies Inc.* v. *Dell Inc. et al.*, Civil Action No. 2:11-CV-179-MS, In the United States District Court for the Eastern District of Texas Marshall Division, served on Jun. 14, 2012, 27 pages.

"Exhibit D.9, Invalidity Contentions for U.S. Patent No. 6,563,786 and 6,992,972 in light of Multicarrier COFDM Scheme in High Bitrate Radio Local Area Networks ("Aldinger") as Base Reference," Defendants' L.P.R. 3-3 Invalidity Contentions, *MOSAID Technologies Inc.* v. *Dell Inc. et al.*, Civil Action No. 2:11-CV-179-MS, In the United States District Court for the Eastern District of Texas Marshall Division, served on Jun. 14, 2012, 31 pages.

"Exhibit D.10, Invalidity Contentions for U.S. Patent No. 6,563,786 and 6,992,972 in light of an Overview of Modulation and Channel Coding Schemes Developed for Digital Terrestrial Television Broadcasting within the dTTb Project ("de Bot") as Base Reference," Defendants' L.P.R. 3-3 Invalidity Contentions, *MOSAID Technologies Inc.* v. *Dell Inc. et al.*, Civil Action No. 2:11-CV-179-MS, In the United States District Court for the Eastern District of Texas Marshall Division, served on Jun. 14, 2012, 39 pages.

"Exhibit D.11, Invalidity Contentions for U.S. Patent No. 6,563,786 and 6,992,972 in light of Multiresolution OFDM ("Maddocks") as Base Reference," Defendants' L.P.R. 3-3 Invalidity Contentions, *MOSAID Technologies Inc.* v. *Dell Inc. et al.*, Civil Action No. 2:11-CV-179-MS, In the United States District Court for the Eastern District of Texas Marshall Division, served on Jun. 14, 2012, 39 pages.

Bingham, "Multicarrier Modulation for Data Transmission: An Idea Whose Time Has Come", IEEE Communications Magazine, pp. 5-14, May 1990.

Alard, et al., "Principles of Modulation and Channel Coding for Digital Broadcasting for Mobile Receivers", EBU Review—Technical, No. 224, pp. 168-190, Aug. 1987.

Armada, et al., "Rapid Prototyping of a Test Modem for Terrestrial Broadcasting of Digital Television", IEEE Transactions on Consumer Electronics, vol. 43 (4), pp. 1100-1109, Nov. 1997.

Buttar, et al., "FFT and OFDM Receiver ICS for DVB-T Decoders", IEEE 0-7803-3734-4, pp. 102-103, 1997.

Chang, "Synthesis of Band-Limited Orthogonal Signals for Multichannel Data Transmission", The Bell System Technical Journal, pp. 1775-1796, Dec. 1966.

Cimini, "Analysis and Simulation of a Digital Mobile Channel Using Orthogonal Frequency Division Multiplexing", IEEE Transactions on Communications, vol. Com. 33 (7), pp. 665-675, Jul. 1985.

Cimini, et al., "OFDM with Diversity and Coding for Advanced Cellular Internet Services", IEEE 0-7803-4198-8, pp. 305-309, 1997.

Choi, "Single Chip COFDM Receiver", International Broadcasting Convention, Conference Publication 447, Sep. 12-16, 1997.

Daffara, et al., "A New Frequency Detector for Orthogonal Multicarrier Transmission Techniques", IEEE 0-7803-2742-X, pp. 804-809, 1995.

De Bot, et al., "An Overview of Modulation and Channel Coding Schemes Developed for Digital Terrestrial Television Broadcasting Within the dTTb Project", International Broadcasting Convention, Conference Pub No. 397, pp. 569-576, Sep. 1994.

European Broadcasting Union, "Digital Video Broadcasting (DVB); Interfaces for DVB Integrated Receiver Decoder (DVB-IRD)", ETSI TS 102 201 Technical Specification, V1.2.1., pp. 1-33, 2005.

European Telecommunication Standard, "Radio Equipment and Systems (RES); High Performance Radio Local Area Networks (Hiperlan); Requirements and Architectures for Wireless ATM Access and Interconnection", Technical Report TR 101 031 V1.1.1. Technical Report, pp. 1-42, Jul. 1997.

European Telecommunication Standard, "Radio Equipment and Systems (RES); High Performance Radio Local Area Networks (Hiperlan) Type 1; Functional Specification", ETS 300 652, pp. 1-112, Oct 1996.

European Telecommunication Standard, "Digital Video Broadcasting (DVB); Framing Structure, Channel Coding and Modulation for Digital Terrestrial Television", Final Draft prETS 300 744, pp. 1-46, Nov. 1996.

European Telecommunication Standard, "Radio Broadcasting Systems; Digital Audio Broadcasting (DAB) to Mobile, Portable and Fixed Receivers", ETS 300 401, pp. 1-206, Feb. 1995.

Engstrom, et al., "A System for Test of Multiaccess Methods Based on OFDM", IEEE 0-7803-1927-3, pp. 1843-1845, 1994.

Hamming, "Error Detecting and Error Correcting Codes", The Bell System Technical Journal, vol. XXIX, No. 2, Apr. 1950.

(56) References Cited

OTHER PUBLICATIONS

Karam, et al., "Variable Symbol—Rate Demodulators for Cable and Satellite TV Broadcasting", IEEE Transactions on Broadcasting, vol. 42, (2), pp. 102-109, Jun. 1996.

Karam, et al., "Design and Performance of a Variable-Rate QAM Modem for Digital Cable Television" International Broadcasting Convention, Conference Publication No. 413, pp. 178-183, 1995.

Le Floch, et al., "Digital Sound Broadcasting to Mobile Receivers", IEEE Transactions on Consumer Electronics, vol. 35 (3), pp. 493-503, Aug. 1989.

Lee, "A Single Chip DVB Receiver for Variable-Rate QPSK Demodulation and Forward Error Correction", Custom Integrated Circuits Conference, IEEE 0-7803-3669-0, pp. 249-252, 1997.

Mills, et al., "DVB Specifications for Broadcast-Related Interactive TV Services", The Institution of Electrical Engineers, pp. 5/1-5/5, 1997.

Mueller, et al, "A Low-Cost DVB Compliant Viterbi and Reed Solomon Decoder", IEEE Transactions on Consumer Electronics, vol. 43 (3), pp. 448-452, Aug. 1997.

Muschallik, "Improving an OFDM Reception Using an Adaptive Nyquist Windowing", IEEE Transactions on Consumer Electronics, vol. 42 (3), pp. 259-269, Aug. 1996.

Ong, et al., "Influence of Guard Times on Packet Error Probabilities in Slotted Frequency-Hopped Spread Spectrum Multiple Access Systems", IEEE 0-7803-1143-3 CCEECE/CCGEI 93, pp. 874-878, 1993.

Peled, et al., "Frequency Domain Data Transmission Using Reduced Computational Complexity Algorithms", IEEE CH1559-4/80/0000, pp. 964-967, 1980.

Reimers, "DVB-T: The COFDM-Based System for Terrestrial Television", Electronics Communication Engineering Journal, vol. 9 (1), pp. 28-32, Feb. 1997.

Sandbank, et al., "DVB Specification for High Definition Television" International Broadcasting Convention, Conference Publication No. 447, Sep. 1997.

Schmidl, et al., "Low-Overhead, Low-Complexity [Burst] Synchronization for OFDM", IEEE 0-7803-3250-4, pp. 1301-1306, 1996.

Schmidl, et al., "Robust Frequency and Timing Synchronization for OFDM", IEEE Transactions on Communications, vol. 45 (12), pp. 1613-1621, Dec. 1997.

Stantchev, et al., "Burst Synchronization for OFDM-Based Cellular Systems with Separate Signaling Channel" IEEE 0-7803-4320-4, pp. 758-762, 1998.

Stott, "The DVB Terrestrial (DVB-T) Specification and its Implementation in a Practical Modem", International Broadcasting Convention, Conference Publication No. 428, pp. 255-260, Sep. 1996.

Tew, "Digital Transmitters for DVB and DTV", International Broadcasting Convention, Conference Publication No. 447, pp. 393-399, Sep. 1997.

Tognin, et al., "A VLSI Solution for a Digital Teresterial TV (DVB-T) Receiver", International Broadcasting Convention, Conference Publication No. 447, pp. 343-348, Sep. 1997.

U.S. Military Standard, "Military Standard, Interoperability and Performance Standards for Data Modems (Mil-Std-188-110a)", pp. 1-78, Sep. 1991.

Van De Beek, et al., "ML Estimation of Time and Frequency Offset in OFDM Systems", IEEE Transactions on Signal Processing, vol. 45 (7), pp. 1800-1805, Jul. 1997.

Van De Beek, et al., "Low-Complex Frame Synchronization in OFDM Systems" IEEE 0-7893-2955-4, pp. 982-986, 1995.

Van Let, "CA-TV Goes Digital: Results from DVB-Experiments in Dutch CATV Systems", International Broadcasting Convention, Conference Publication No. 413, pp. 184-188,1995.

Van Der Waal, "DAB Datacasting in the Netherlands", International Broadcasting Convention, Conference Publication No. 413, pp. 67-70,1995.

Magic Wand, "ACTS Project AC085 Wireless ATM Network Demonstrator—Deliverable 1D5 WAND and System Specification", Aug. 1998, pp. 1-63.

Aldis, J.P., et al., "Physical Layer Architecture and Performance in the WAND User Trial System," ACTS Mobile Communications, Summer 1996, Granada, Spain, Nov. 27-29, 1996, pp. i-x, 196-203.

Aldinger, M., "Multicarrier COFDM Scheme in High Bitrate Radio Local Area Networks," Personal, Indoor and Mobile Radio Communications, Wireless Networks—Catching the Mobile Future, 5th IEEE International Symposium, Sep. 1994, pp. 969-973.

Aldis, James, et al., "Magic into Reality, building the WAND modem," ACTS mobile Communications Summit, Aalborg, Denmoark, Oct. 1997, pp. 775-780.

Van Nee, Richard, et al., "OFDM for Wireless Multimedia Communications," Artech House Publishers, 2000, pp. 73-93.

Harris Modems, "RF-3466 HF High-Speed Data Modem," 1989, 1398 pages.

* cited by examiner

FREQUENCY DIVISION MULTIPLEXING SYSTEM WITH SELECTABLE RATE

RELATED APPLICATIONS

This application is a divisional of U.S. application Ser. No. 11/156,140, filed Jun. 17, 2005, issued as U.S. Pat. No. 8,111,607, which is a continuation of U.S. application Ser. No. 10/410,375, filed Apr. 9, 2003, issued as U.S. Pat. No. 6,992,972, which is a continuation of U.S. application Ser. No. 09/224,695, filed Jan. 4, 1999, issued as U.S. Pat. No. 6,563,786, which claims priority to EP Application No. 98200010.1, filed Jan. 6, 1998.

The entire teachings of the above applications are incorporated herein by reference.

FIELD OF THE INVENTION

This invention relates to communication systems and, more particularly, OFDM (Orthogonal Frequency Division Multiplexing) modulation schemes.

DESCRIPTION OF RELATED ART

OFDM is a block-oriented modulation scheme that maps N data bits into N orthogonal sub-carriers separated by a frequency interval of 1/T, where T is the symbol duration, i.e. the time period over which the sub-carriers are orthogonal. As such, multi-carrier transmission systems use OFDM modulation to send data bits in parallel over multiple sub-carriers (also called tones or bins). An important advantage of multi-carrier transmission is that inter-symbol interference due to signal dispersion (or delay spread) in the transmission channel can be reduced or even eliminated by inserting a guard time interval $T_G$ between the transmission of subsequent symbols, thus avoiding an equalizer as required in single carrier systems. This gives OFDM an important advantage over single carrier modulation schemes. The guard time allows delayed copies of each symbol, arriving at the receiver after the intended signal, to die out before the succeeding symbol is received. OFDM's attractiveness stems from its ability to overcome the adverse effects of multi-channel transmission without the need for equalization.

The transformations between blocks of symbols and baseband carrier signal are normally carried out using fast Fourier transform (FFT) techniques. A discussion of OFDM is given by Alard and Lasalle, EBU Technical Review, no. 224, August 1987, pages 168-190.

A need exists for a flexible OFDM system which provides the advantages of OFDM to a variety of communication environments.

In a previous patent application (U.S. Ser. No. 08/834,684, herein referred to as VN) I disclosed several techniques to scale data rates using OFDM. Scaling methods involve changing the clock rate, FFT size, coding rate, constellation size and guard time.

The present invention is intended to provide fallback rates with a minimum change in hardware.

SUMMARY OF THE INVENTION

An orthogonal frequency division multiplexing communications apparatus employs a set of sub-carriers, which are orthogonal over a time T, and symbols expressed by superpositions of the sub-carriers.

The apparatus is configured to selectively operate in one of a plurality of signaling modes in each of which the duration of each symbol is KT, where K is a positive integer, and different modes have different values of K and the same set of sub-carriers. The symbols may be associated with guard times, each of which has a length $KT_G$, where $T_G$ is the same for all of the signaling modes. Thus, signaling modes with greater values of K may have greater guard time lengths.

In one embodiment of the present invention, a first signaling mode (the 'normal' mode) uses a symbol length T, a guard time $T_G$ and a set of N sub-carriers and a second mode (the 'fallback' mode) uses a symbol length KT, a guard time $KT_G$ and the same set of N sub-carriers, where K is an integer greater than unity.

The technique can increase the range and delay spread tolerance without substantially changing the bandwidth and without changing the FFT size, at the cost of a decreased bit rate. Further, the fallback rates can also be used to provide a multiple access capability, so using fallback rates does not necessarily result in a bad spectral efficiency.

DETAILED DESCRIPTION

Figure 1:
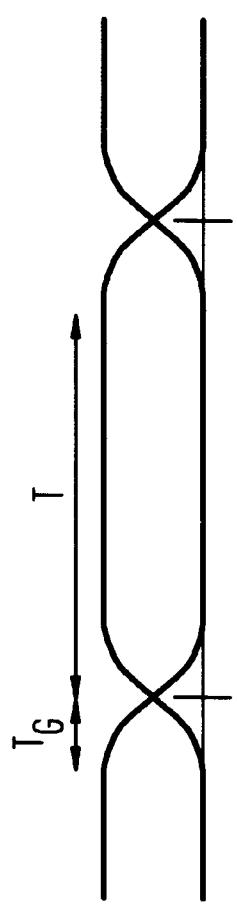
FIGS. 1 and 2 illustrate the transmission of an ofdm symbol in k=1 mode and k=2 mode according to the invention.

FIG. 1 shows an OFDM symbol transmitted with a symbol duration T and a guard time $T_G$. The object of the guard time $T_G$ is to accommodate any interference between consecutive symbols due to dispersion or multi-path interference (collectively referred to as 'delay spread'), and to leave a time T over which the symbol can be received free from such interference. Under some conditions, or in some applications, it may happen that the guard time $T_G$ is insufficient to accommodate this delay spread (as in FIG. 1). It may also happen that a greater range will be required, i.e. a higher signal-to-noise ratio in the recovered signal. Simply increasing the guard time $T_G$ would accommodate a larger delay spread, though it would not affect the range. Decreasing the clock rate seems a simple way of increasing the guard time $T_G$ and the symbol duration T, but it would also decrease the frequency spacing 1/T between the sub-carriers. This would proportionately decrease the overall bandwidth of the channel, which would mean that the filters that are required to remove aliases would have to be adaptable, thus increasing the hardware requirement.

Figure 2:
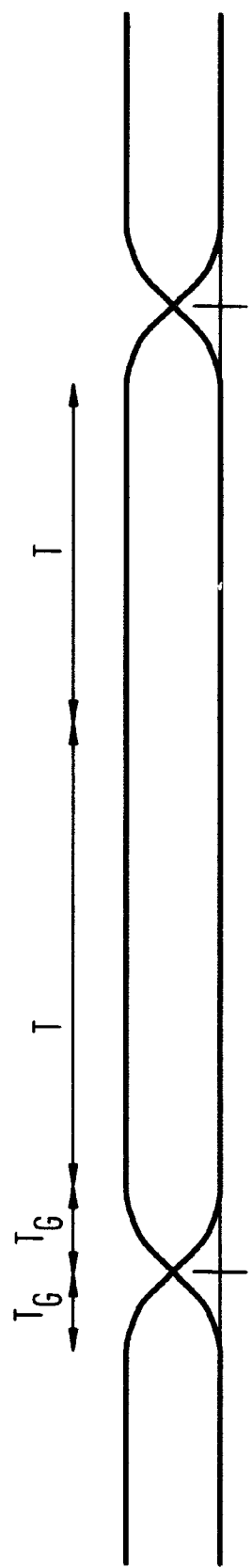

FIG. 2 shows a symbol which has been transmitted with twice the symbol duration 2T and with twice the guard time $2T_G$. The guard time is now doubled, and can accommodate the illustrated intersymbol interference. Also, since the symbol duration is doubled, the signal-to-noise performance, and hence the range, is improved. It is important to note that the frequencies of the sub-carriers are not also halved as would be the case with a simple halving of the clock rate. The same set of sub-carriers is used, still separated by 1/T, not 1/2 T. Therefore, the overall bandwidth of the channel, which is mainly determined by the spread of subcarrier frequencies, and only to a much lesser extent by the widths of the individual sub-carriers, is substantially unchanged.

Since for any OFDM symbol, the signal repeats itself after T seconds, where T is the FFT interval, it is possible to do 2 FFTs on two different parts of the received symbol, each with a length of T seconds. Since both FFT outputs carry the same data, but different noise, they can be averaged to get a 3 dB increase in signal-to-noise ratio. The FFT is a linear operation, so it is also possible to first average two T seconds intervals and use this averaged signal as input to a single FFT. This scheme can easily be extended to other data rates; in general, any rate which is a factor K less than the highest bit rate can be produced by extending the symbol duration by a factor of K. By taking K FFTs per symbol, a processing gain of K is achieved which increases the range. At the same time, the delay spread tolerance is increased by a factor of K. The only extra hardware required is for averaging K consecutive signal intervals of T seconds. In fact, the amount of processing in terms of operations per second is decreased for fallback rates, because the averaging takes far less processing than the FFT. Consider, for instance, the case of an OFDM modem with a 64 point FFT and a symbol duration of 2 μs. A 64 point FFT involves about 192 complex multiplications and additions, so the processing load is 96 Mops, where an operation is defined as one complex multiply plus one addition. If the symbol duration is doubled to create a fallback rate, then in 4 .mu.s, 64 additions have to be performed plus one 64 point FFT. Thus, the processing load becomes (192+64)/4 μs=64 Mops. In fact, this figure is pessimistic, because the extra additions have been given the same weight as multiplications, while they are significantly less complex when implemented in hardware. The additions are the only part of the receiver that has to run at the full clock rate; the FFT and everything following the FFT (channel estimation, decoding) can run at a rate that is K times lower than the original rate, which helps to reduce the power consumption.

Figure 3:
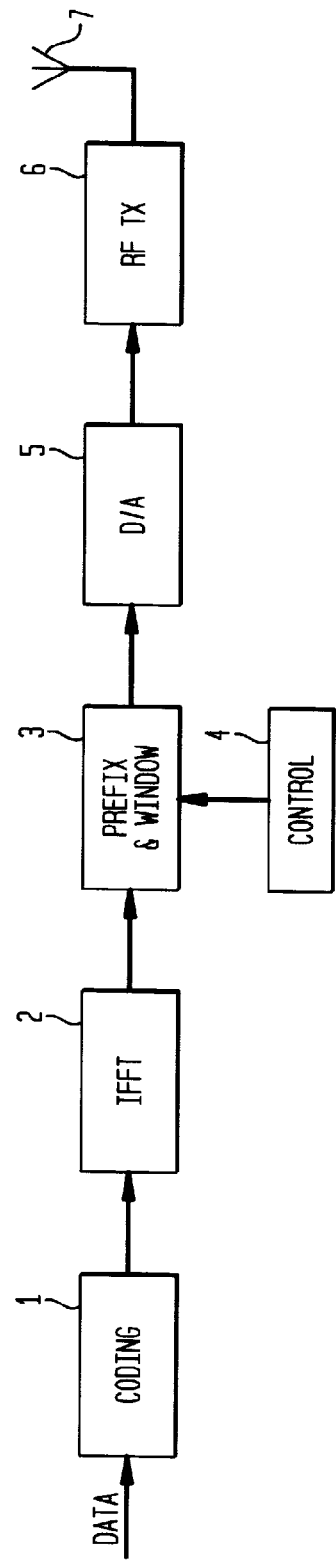
FIG. 3 shows, in block schematic form, a transmitter embodying the invention.

FIG. 3 shows an OFDM transmitter which receives a stream of data bits. A coding circuit 1 receives the data stream and partitions it into successive groups or blocks of bits. The coding circuit 1 introduces redundancy for forward error correction coding.

The blocks of coded data bits are input into an N-points complex IFFT (Inverse Fast Fourier Transform) circuit 2 where N is the number of the OFDM subcarriers. In this particular embodiment, using quaternary phase-shift keying (QPSK), the IFFT is performed on blocks of 2N coded data bits received from the coding circuit 1. In practice, the transmitter has to use oversampling to produce an output spectrum without aliasing which introduces unwanted frequency distortion due to (intended or unintentional) low pass filtering in subsequent stages of the transmitter or in the transmission channel. Thus, instead of an N-points IFFT an M-points IFFT is actually done where M>N to perform the oversampling. These 2N bits are converted into N complex numbers, and the remaining M-N input values are set to zero.

To decrease the sensitivity to inter-symbol interference, the cyclic prefixer and windowing block 3 copies the last part of the OFDM symbol and augments the OFDM symbol by pre-fixing it with the copied portion of the OFDM symbol. This is called cyclic prefixing. Control circuitry 4 controls the cyclic prefixer and windowing block 3 to switch the guard time and the symbol duration as required, or as appropriate, between their normal values $T_G$ and T respectively and their fallback values $KT_G$ and KT respectively. To provide the fallback values the cyclic prefixer has to augment the OFDM symbol with K−1 copies of itself, in addition to the prefix, which is preferably K times as long as the normal prefix.

To reduce spectral sidelobes, the cyclic prefixing and windowing block 3 performs windowing on the OFDM symbol by applying a gradual roll-off pattern to the amplitude of the OFDM symbol. The OFDM symbol is input into a digital-to-analogue converter after which it is sent to a transmitter front-end 6 that converts the baseband wave form to the appropriate RF carrier frequency in this particular embodiment for transmission from antenna 7.

Figure 4:
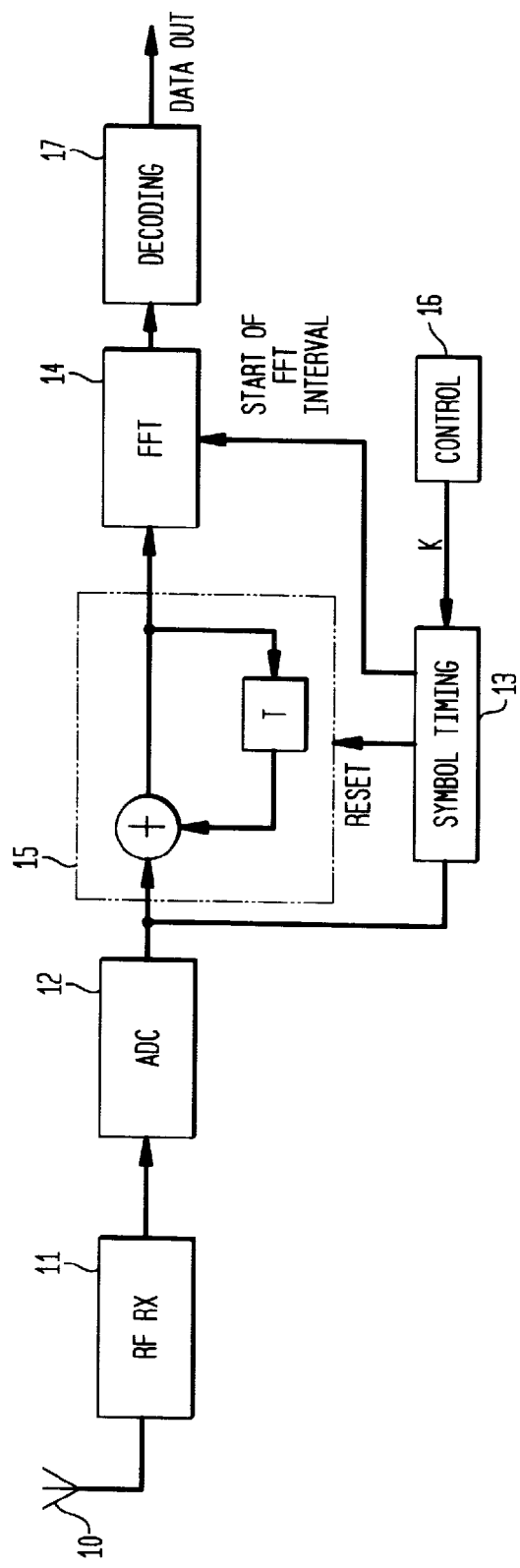
FIG. 4 shows, in block schematic form, a receiver embodying the invention.

With particular reference to FIG. 4, the transmitted OFDM signal is received by an OFDM receiver through an antenna 10. The OFDM signal is processed (down-converted) using the receive circuitry 11. The processed OFDM signal is input into an analog-to-digital converter 12. The digital OFDM signal is received by a symbol timing circuit 13 which acquires the OFDM symbol timing and provides a timing signal to a Fast Fourier Transform (FFT) block 14 and an integrate and dump filter 15. The integrate and dump filter 15 sums K samples that are separated by T seconds. The memory of the filter which consists of a delay line of M samples, where M is the FFT size—is cleared at the start of each new symbol. This reset time is indicated by the timing circuit 13 which is already present in a normal OFDM receiver to indicate the start of the FFT interval. A control circuit 16 sets the number of averaging intervals K.

As an alternative implementation, the integrate and dump filter could be placed after the FFT circuit 14 instead of before. In that case, for each symbol, K consecutive FFT outputs are averaged. However, the processing load is increased because the FFT always has to run at the maximum clock rate.

The sequence of symbols produced by the FFT circuit 14 is applied to conventional decoding circuitry 17 to produce the data output signal.

When a fallback rate is used at a rate that is K times lower than the original rate, the above described technique will produce subcarriers each of which has a bandwidth that is K times smaller than the original bandwidth. Thus, although the total signal bandwidth does not substantially change, the bandwidth of each subcarrier does become smaller. This makes it possible to do frequency division multiple access of up to K users in the same band. Each user has to shift its carrier frequency by a different multiple of 1/KT in order to stay orthogonal to the other users. As an example, when 64 subcarriers are used with a subcarrier spacing of 1 MHz, then it is possible to accommodate 4 users in the same channel when using a fallback rate with K=4. All 4 users use the same transmission and reception scheme as described above, but their carrier frequencies have an offset of 0, 250, 500 and 750 kHz, respectively, or, in general, n/KT, where the values of n are different MODULO K.

As discussed in VN, the control circuits 4, 16 may be responsive to external settings and/or the results of monitoring the signal quality. As also discussed in VN, it may be appropriate to use different modes for the up-links and the down-links in a communications system.

What is claimed is:
1. A receiver operable to:
receive a first orthogonal frequency division multiplex (OFDM) symbol, the first OFDM symbol being expressed by superpositions of a set of sub-carriers which are orthogonal over a time T, wherein the duration of the first OFDM symbol is T and the first OFDM symbol is associated with a first guard time having a length of $T_G$; and
receive a second OFDM symbol, the second OFDM symbol expressed by superpositions of the same set of sub-carriers used to express the first OFDM symbol, the second OFDM symbol being the next OFDM symbol after or the previous OFDM symbol before the first OFDM symbol in a sequence of OFDM symbols, wherein the duration of the second OFDM symbol is KT and the second OFDM symbol is associated with a sec- ond guard time having a length of $KT_G$, where K is a positive integer greater than one.

2. The receiver as claimed in claim 1 wherein the first guard time is interposed between successive OFDM symbols.

3. The receiver as claimed in claim 1 wherein the first guard time is prefixed to the first OFDM symbol and the second guard time is prefixed to the second OFDM symbol.

4. The receiver as claimed in claim 1 including a fast Fourier transform (FFT) block to perform a Fourier transform on a received signal.

5. The receiver as claimed in claim 4 wherein a period of the Fourier transform is the time T.

6. The receiver as claimed in claim 5 further including a filter operably coupled to an input of the FFT block.

7. The receiver as claimed in claim 6 wherein the filter averages an input signal over K intervals, each interval having a duration T.

8. The receiver as claimed in claim 7 wherein the filter includes a memory having a delay line established to receive M samples, where M corresponds to the number of samples in each block of data operated upon by the FFT block.

9. The receiver as claimed in claim 4 further including a filter operably coupled to an output of the FFT block.

10. The receiver as claimed in claim 9 wherein the filter averages K outputs from the FFT block.

11. The receiver as claimed in claim 4 further including an antenna for receiving the first OFDM symbol and the second OFDM symbol.

12. The receiver as claimed in claim 11 further including an RF down-converter.

13. The receiver as claimed in claim 1, wherein the second OFDM symbol consists of K copies of a third OFDM symbol, the third OFDM symbol being expressed by superpositions of the same set of sub-carriers used to express the first OFDM symbol, the third OFDM symbol having a symbol duration T.

14. A method comprising:
receiving a first orthogonal frequency division multiplex (OFDM) symbol, the first OFDM symbol being expressed by superpositions of a set of sub-carriers which are orthogonal over a time T, wherein the duration of the first OFDM symbol is T and the first OFDM symbol is associated with a first guard time having a length of $T_G$; and
receiving a second OFDM symbol, the second OFDM symbol expressed by superpositions of the same set of sub-carriers used to express the first OFDM symbol, the second OFDM symbol being the next OFDM symbol after or the previous OFDM symbol before the first OFDM symbol in a sequence of OFDM symbols, wherein the duration of the second OFDM symbol is KT and the second OFDM symbol is associated with a second guard time having a length of $KT_G$, where K is a positive integer greater than one.

15. The method of claim 14, wherein the first guard time is interposed between successive OFDM symbols.

16. The method of claim 14, wherein the first guard time is prefixed to the first OFDM symbol and the second guard time is prefixed to the second OFDM symbol.

17. The method of claim 14 further comprising:
performing a Fourier transform on the first OFDM signal, where a period of the Fourier transform is the time T.

18. The method of claim 14 further comprising:
determining an average of K successively received OFDM signals.

19. The method as claimed in claim 14, wherein the second OFDM symbol consists of K copies of a third OFDM symbol, the third OFDM symbol being expressed by superpositions of the same set of sub-carriers used to express the first OFDM symbol, the third OFDM symbol having a symbol duration T.

20. A receiving system comprising:
an orthogonal frequency division multiplex (OFDM) receiver comprising:
an analog to digital converter (ADC); and
a fast Fourier transform (FFT) block, operably coupled to the ADC, configured to perform a Fourier transform on an output of the ADC;
the receiver being configured to:
receive a first OFDM symbol, the first OFDM symbol being expressed by superpositions of a set of sub-carriers which are orthogonal over a time T, wherein the first OFDM symbol is associated with a first guard time $T_G$ and the first OFDM symbol has a symbol duration T; and
receive a second OFDM symbol, the second OFDM symbol expressed by superpositions of the same set of sub-carriers used to express the first OFDM symbol, the second OFDM symbol being the next OFDM symbol after or the previous OFDM symbol before the first OFDM symbol in a sequence of OFDM symbols, wherein the second OFDM symbol is associated with a second guard time $KT_G$ and the second OFDM symbol has a symbol duration KT, where K is a positive integer greater than 1.

21. The receiving system as claimed in claim 20 further comprising a receiver front-end that converts a waveform at an RF carrier frequency into a baseband waveform.

22. The receiving system as claimed in claim 21 further comprising an antenna for receiving the waveform at the RF carrier frequency.

23. The receiving system as claimed in claim 20 wherein a period of the Fourier transform is the first OFDM symbol duration T.

24. The receiving system as claimed in claim 20 further comprising a filter coupled to the FFT block.

25. The receiving system as claimed in claim 24 further including a symbol timing circuit, operably coupled to the FFT block and the filter, that provides a timing signal to the FFT block and the filter such that the timing signal indicates the start of a new FFT interval to the FFT block and the filter.

26. The receiving system as claimed in claim 20 wherein K=2 such that the second guard time associated with the second OFDM symbol is twice the length of the first guard time associated with the first OFDM symbol.

27. The receiving system as claimed in claim 20 wherein the first guard time $T_G$ is interposed between successive OFDM symbols.

28. The receiving system as claimed in claim 20 wherein the first guard time $T_G$ is prefixed to the first OFDM symbol.

29. The receiving system as claimed in claim 20, wherein the second OFDM symbol consists of K copies of a third OFDM symbol, the third OFDM symbol being expressed by superpositions of the same set of sub-carriers used to express the first OFDM symbol, the third OFDM symbol having a symbol duration T.

30. A transmitter operable to:
transmit a first orthogonal frequency division multiplex (OFDM) symbol, the first OFDM symbol being expressed by superpositions of a set of sub-carriers which are orthogonal over a time T, wherein the duration of the first OFDM symbol is T and the first OFDM symbol is associated with a first guard time having a length of $T_G$; and
transmit a second OFDM symbol, the second OFDM symbol expressed by superpositions of the same set of subcarriers used to express the first OFDM symbol, the second OFDM symbol being the next OFDM symbol after or the previous OFDM symbol before the first OFDM symbol in a sequence of OFDM symbols, wherein the duration of the second OFDM symbol is KT and the second OFDM symbol is associated with a second guard time having a length of $KT_G$, where K is a positive integer greater than one.

31. The transmitter as claimed in claim 30 wherein the first guard time is interposed between successive OFDM symbols.

32. The transmitter as claimed in claim 30 wherein the first guard time is prefixed to the first OFDM symbol and the second guard time is prefixed to the second OFDM symbol.

33. The transmitter as claimed in claim 30, wherein the second OFDM symbol consists of K copies of a third OFDM symbol, the third OFDM symbol being expressed by superpositions of the same set of sub-carriers used to express the first OFDM symbol, the third OFDM symbol having a symbol duration T.

34. A method comprising:
transmitting a first orthogonal frequency division multiplex (OFDM) symbol, the first OFDM symbol being expressed by superpositions of a set of sub-carriers which are orthogonal over a time T, wherein the duration of the first OFDM symbol is T and the first OFDM symbol is associated with a first guard time having a length of $T_G$; and
transmitting a second OFDM symbol, the second OFDM symbol expressed by superpositions of the same set of sub-carriers used to express the first OFDM symbol, the second OFDM symbol being the next OFDM symbol after or the previous OFDM symbol before the first OFDM symbol in a sequence of OFDM symbols, wherein the duration of the second OFDM symbol is KT and the second OFDM symbol is associated with a second guard time having a length of $KT_G$, where K is a positive integer greater than one.

35. The transmitter as claimed in claim 34 wherein the first guard time is interposed between successive OFDM symbols.

36. The transmitter as claimed in claim 34 wherein the first guard time is prefixed to the first OFDM symbol and the second guard time is prefixed to the second OFDM symbol.

37. The method as claimed in claim 34, wherein the second OFDM symbol consists of K copies of a third OFDM symbol, the third OFDM symbol being expressed by superpositions of the same set of sub-carriers used to express the first OFDM symbol, the third OFDM symbol having a symbol duration T.

38. A transmitting system comprising:
an orthogonal frequency division multiplex (OFDM) transmitter comprising:
a coding circuit that forms symbols from groups of bits; and
an inverse Fourier transform circuit, operably coupled to the coding circuit, that performs an inverse Fourier transform on said symbols to produce OFDM symbols; and
wherein the OFDM transmitter is configured to:
transmit a first OFDM symbol, the first OFDM symbol being expressed by superpositions of a set of sub-carriers which are orthogonal over a time T, wherein the first OFDM symbol is associated with a first guard time $T_G$ and the first OFDM symbol has a symbol duration T; and
transmit a second OFDM symbol, the second OFDM symbol expressed by superpositions of the same set of sub-carriers used to express the first OFDM symbol, the second OFDM symbol being the next OFDM symbol after or the previous OFDM symbol before the first OFDM symbol in a sequence of OFDM symbols, wherein the second OFDM symbol is associated with a second guard time $KT_G$ and the second OFDM symbol has a symbol duration KT, where K is a positive integer greater than 1.

39. The transmitting system as claimed in claim 38, wherein the second OFDM symbol consists of K copies of a third OFDM symbol, the third OFDM symbol being expressed by superpositions of the same set of sub-carriers used to express the first OFDM symbol, the third OFDM symbol having a symbol duration T.

\* \* \* \* \*